Jan. 10, 1928.
N. A. WATSON
1,655,980
ROAD MAKING AND REPAIRING MACHINE
Filed Feb. 27, 1926
4 Sheets-Sheet 3
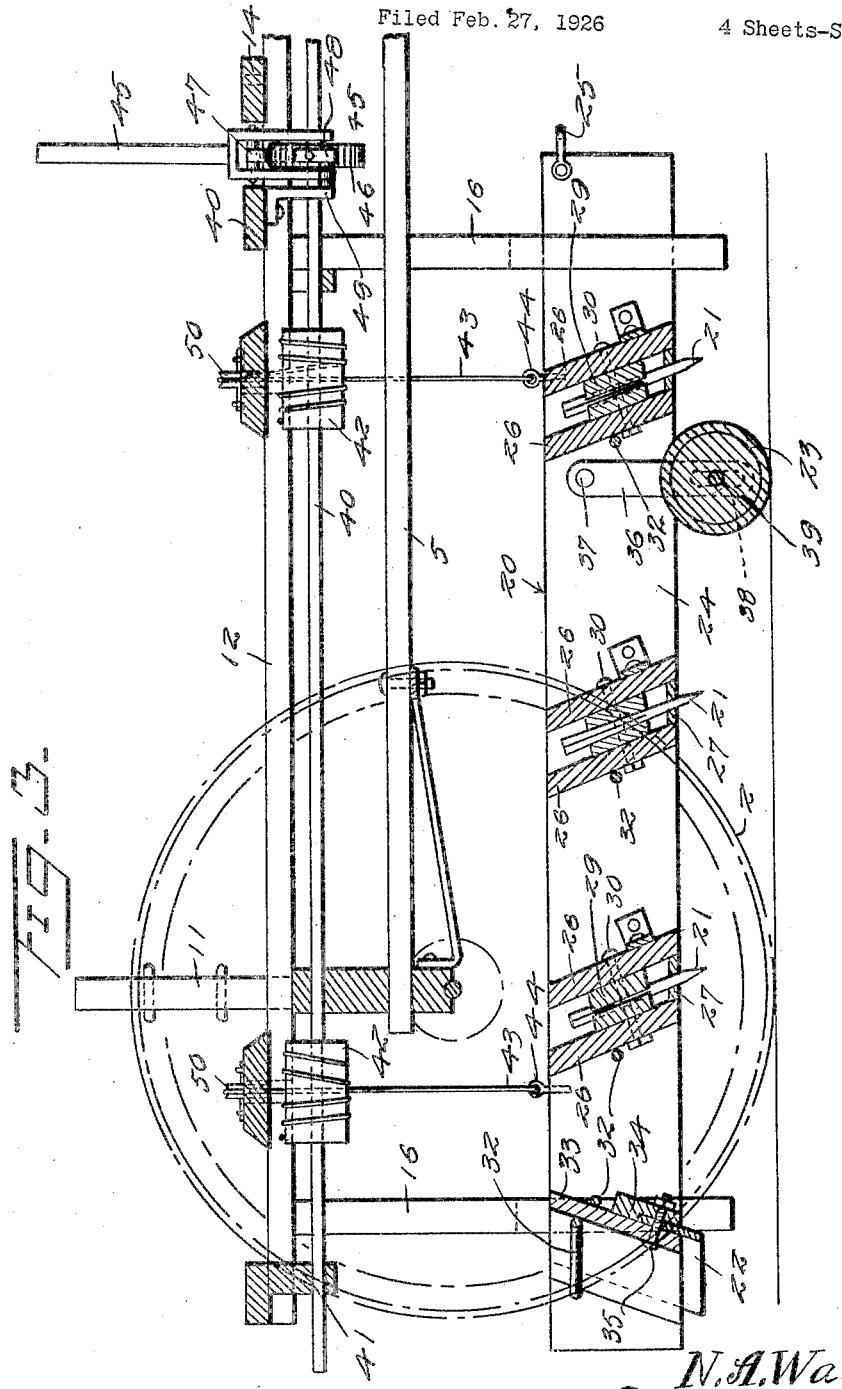
Inventor
N. A. Watson

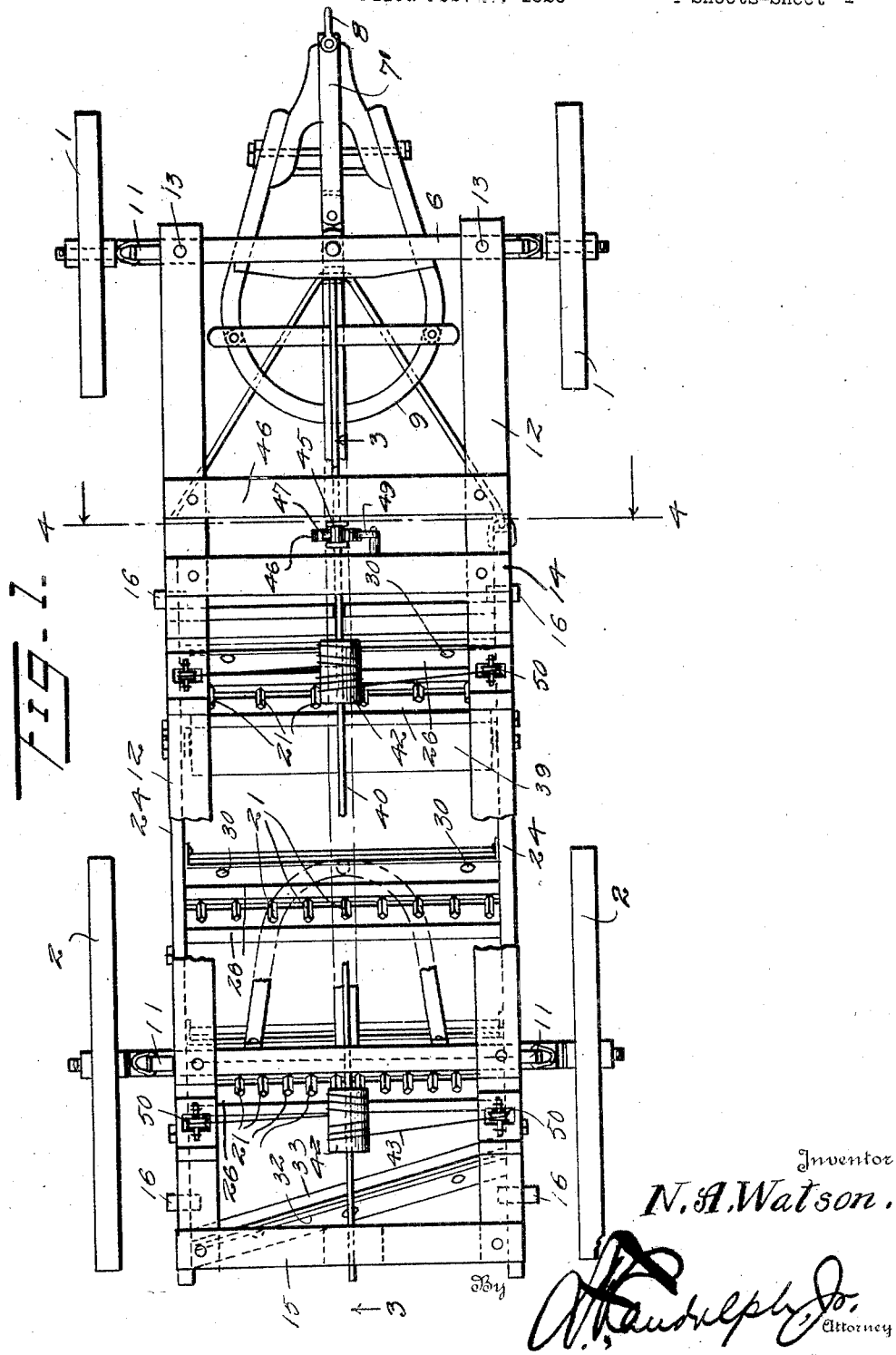

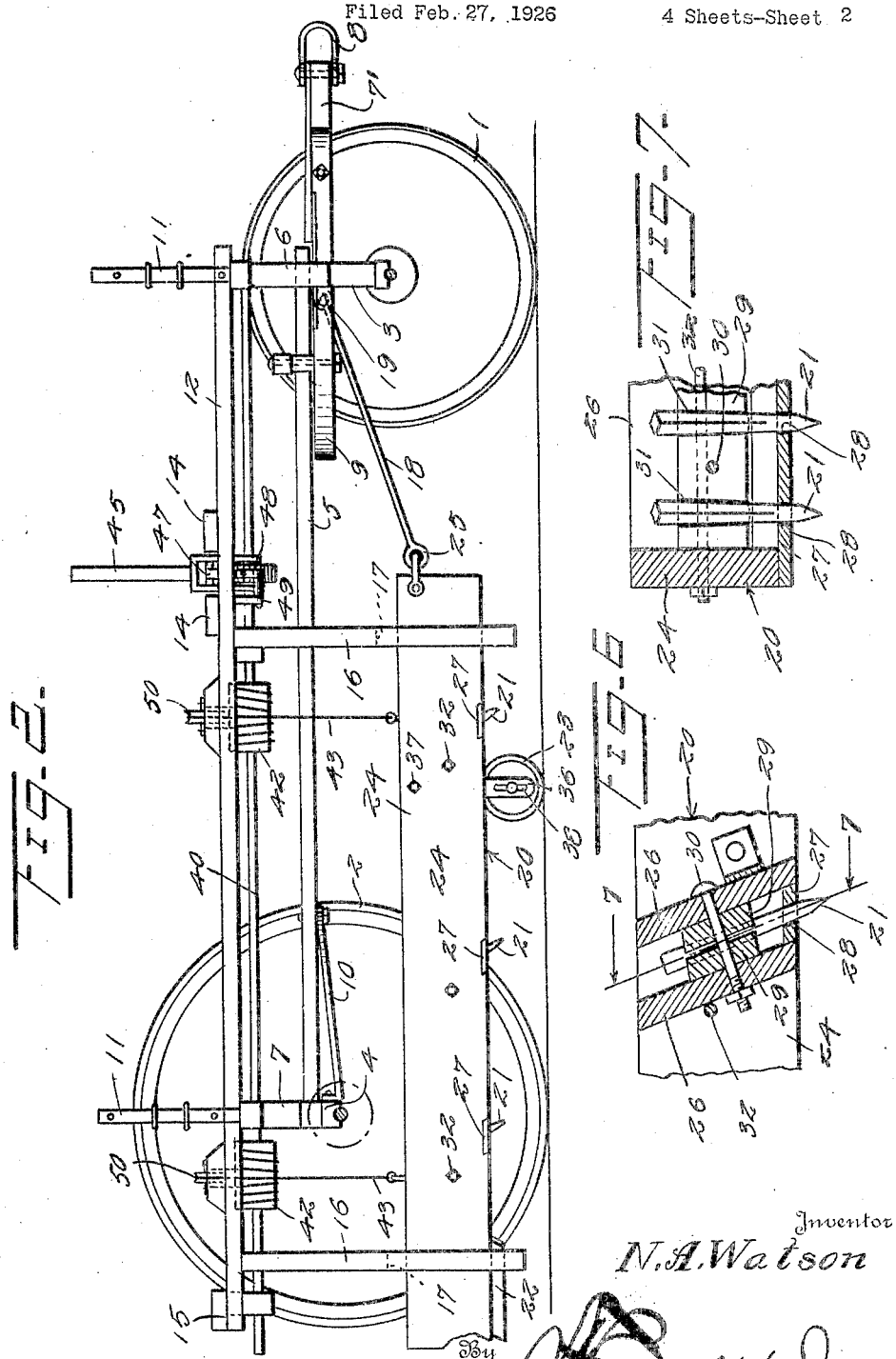

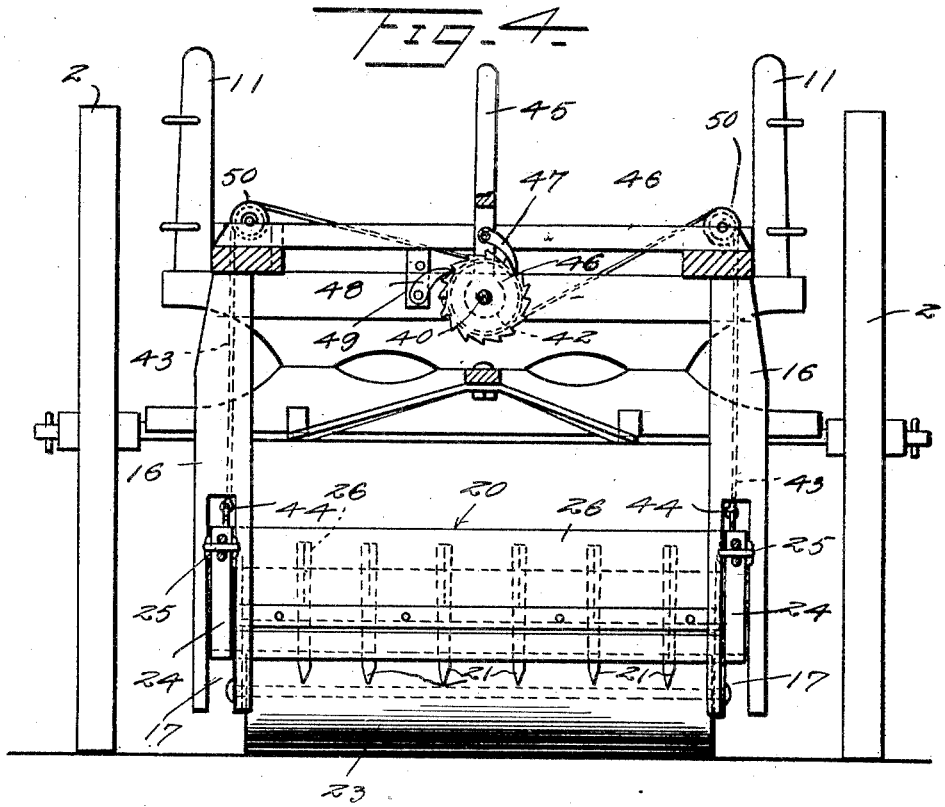
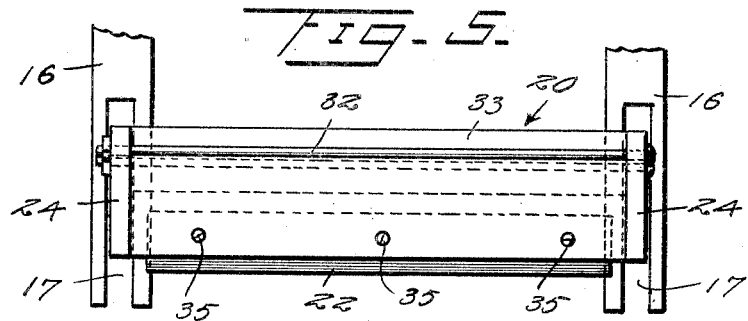

Patented Jan. 10, 1928.

1,655,980

UNITED STATES PATENT OFFICE.

NEILL A. WATSON, OF FAYETTEVILLE, NORTH CAROLINA.

ROAD MAKING AND REPAIRING MACHINE.

Application filed February 27, 1926. Serial No. 91,147.

This invention relates to road making and repairing machines, and has for one of its objects to provide a novel and simple ground working unit for machines of this character, and a novel and simple means for connecting the ground working unit to a running gear of any well known construction.

A further object of the invention is to provide means of the character stated which shall be adapted to connect the ground working unit to the running gear for vertical adjustment with respect thereto.

A further object of the invention is the provision of novel and simple means by which the ground working unit may be raised into and supported in inoperative position.

A further object of the invention is the provision of a ground working unit which shall include a frame, rows of teeth carried by the frame and arranged one in rear of the other, and a scraper carried by the frame in rear of the rows of teeth.

A still further object of the invention is the provision of a ground working unit which shall also include a weighted roller mounted for vertical adjustment with respect to the frame so as to permit it to remain in contact with the ground when the unit is raised to carry the teeth and scraper out of engagement with the ground.

With the foregoing and other objects in view, the invention consists of the construction, combination and arrangement of parts hereinafter fully described and claimed, and illustrated in the accompanying drawings, wherein:

Figure 1 is a top plan view of a road making and repairing machine embodying my invention, Figure 2 is a view in side elevation of the road making and repairing machine, Figure 3 is a longitudinal sectional view taken on the vertical plane indicated by the line 3—3 of Figure 1, Figure 4 is a transverse sectional view taken on the vertical plane indicated by the line 4—4 of Figure 1, Figure 5 is a detail view in rear elevation of the ground working unit, Figure 6 is a detail sectional view on an enlarged scale illustrating the manner in which the teeth of the ground working unit are secured to the frame of said unit, and Figure 7 is a detail sectional view taken on the plane indicated by the line 7—7 of Figure 6.

Corresponding and like parts are referred to in the following description, and designated in the several views of the accompanying drawings, by similar reference characters.

To illustrate the application of the invention, there is shown in the drawings a running gear of well known construction and comprising front wheels 1, rear wheels 2, front axle 3, rear axle 4, reach bar 5, front bolster 6 and rear bolster 7. The running gear also comprises a tongue 7', a clevis 8 secured to the tongue, hounds 9 and 10 and stakes 11 secured to the bolsters.

In accordance with the present invention, longitudinal beams 12 are secured as at 13 to the bolsters 6 and 7. The beams 12 are secured to the bolsters 6 and 7 adjacent the ends of the latter, and are held against relative movements by the securing elements 13, closely related front cross bars 14 and a rear cross bar 15. A pair of vertical bars 16 are secured to and extend downwardly from each beam 12, and are provided with vertical slots 17 which open out through their front and rear sides and lower ends. These parts and a drag yoke 18 pivotally connected as at 19 to the front axle 3, comprise the means for connecting the ground working unit to the running gear. This means involves a construction which not only permits it to be readily secured to the running gear shown in the drawings but to any of the many well known other running gears now on the market and in use.

The ground working unit comprises a frame 20, teeth 21, scraper 22 and weighted roller 23. The frame 20 comprises side bars 24 which are loosely received by the slots 17 of the bars 16 and to the front ends of which the drag yoke 18 is connected as at 25. The cross bars 26 of the frame 20 are arranged in pairs, and the cross bars of each pair are relatively spaced. The spaces between the respective pairs of cross bars 26 are closed at their lower sides by boards 27 which are provided with openings 28 through which the teeth 21 project. A row of the teeth 21 is arranged between each pair of the cross bars 26. The number of teeth in the second row is greater than the number of teeth in the first or front row, and the number of teeth in the last or rear row is greater than the number of teeth in the second or intermediate row. Each row of the teeth 21 is secured to and between each pair of the cross bars 26 by clamp bars 29 which are in turn secured in place by bolts 30. The shanks of the teeth 21 are polygonal, and the clamp bars 29 are provided with polygonal recesses 31 for the reception of the shanks. The frame 20 is reenforced by cross rods 32. The rear cross bar 33 of the frame 20 is diagonally arranged. The scraper 22 which also extends diagonally of the frame 20, is secured against the front side of the cross bar 33 by a clamp bar 34 and bolts 35. Bearing hangers 36 are pivoted as at 37 to the inner sides of the side bars 24, and are provided near their free ends with longitudinally extending slots 38 for the reception of the ends of the shaft 39 of the roller 23.

The ground working unit is mounted for vertical adjustment, is held against lateral movement by the bars 16, and is caused to follow the movement of the running gear by the drag yoke 18. The teeth 21 and the scraper 22 project below the frame 20, and are adapted when in active position to be held in engagement with the ground under the weight of the frame. As the bearing hangers 36 are pivotally connected to the frame 20, and as its shaft 39 is connected to the bearing hangers for movement in the direction of the length thereof, the roller 23 will not prevent the lowering of the frame when it is desired to effect the engagement of the teeth 21 and scraper 22 with the ground and will remain in contact with the ground when the frame is raised to move the teeth and scraper out of engagement with the ground. It will thus be apparent that the ground may be first harrowed and scraped and thereafter rolled.

The means by which the frame 20 may be raised and lowered comprises a shaft 40 extending longitudinally of the running gear and journaled in bearings 41, drums 42 fixed to the shaft, cables 43 wound about the drums and connected as at 44 to the frame bars 24, a lever 45 pivoted to the shaft, a ratchet wheel 46 fixed to the shaft, and a pawl 47 pivoted to the lever and engaging the ratchet wheel. The frame 20 is adapted to be held in raised position by a pawl 48 engaging the ratchet wheel 46, and pivoted to a bracket 49 carried by and depending from one of the front cross bars 14. When the frame 20 is in raised position the teeth 21 and scraper 22 will be out of engagement with the ground and the roller 23 in contact with the ground. When it is desired to bring about the engagement of the teeth 21 and scraper 22 with the ground, the pawl 48 is moved out of engagement with the ratchet wheel 46, whereupon the frame 20 carries and holds the teeth and scraper in contact with the ground. The cables 43 pass over pulleys 50 supported by the beams 12. The machine may be pulled by a tractor which can be connected thereto through the medium of the clevis 8.

From the foregoing description, taken in connection with the accompanying drawings, it is believed that the advantages of the construction and operation of the machine will be readily apparent to those skilled in the art to which it appertains.

It should be understood that the drawings are merely illustrative and do not pretend to give exact proportions. Furthermore, the said drawings are illustrative of a preferred construction, it being my expectation that various changes and modifications may be made without departing from the spirit and scope of the invention.

What is claimed is:—

1. A machine of the character set forth, including a frame having side bars and pairs of closely related cross bars, rows of teeth positioned between each pair of cross bars, clamp bars positioned between each pair of cross bars and engaging the teeth, means securing the clamp bars to the cross bars, and boards closing the lower sides of the spaces between the pairs of cross bars and having openings through which the teeth project.

2. In combination, a running gear, beams extending longitudinally of and secured to the running gear, a cross bar secured to the beams, a shaft extending longitudinally of and journaled on the running gear between the beams, bars secured to and depending from the beams and provided with vertical slots, a vertically movable frame having its sides loosely positioned in the slots of the bars, ground working implements carried by the frame, drums secured to the shaft, pulleys journaled upon the beams, cables wound on the drums and passing over the pulleys and connected to the frame, a lever pivoted to the shaft, a ratchet wheel fixed to the shaft, a pawl pivoted to the lever and engaging the ratchet wheel, and a pawl pivotally connected to the cross bar and engaging the ratchet wheel.

3. In combination, a running gear, beams secured to and extending longitudinally of the running gear, a pair of bars secured to and depending from each beam and provided with vertical slots opening out through their front and rear sides and lower ends, a vertically movable frame having its sides loosely positioned in the slots of the bars, ground working implements carried by the frame, and frame adjusting means.

4. In combination, a running gear, a frame, ground working implements carried by the frame, means connecting the frame to the running gear for vertical adjustment with respect thereto, bearing hangers having a free pivotal connection with the frame, and a roller journaled in the hangers and contacting with the ground, the hangers permitting the roller to remain in contact with the ground during and after the upward adjustment of the frame to raise the ground working implements out of contact with the ground.

5. In combination, a running gear, a frame, ground working implements carried by the frame, means connecting the frame to the running gear for vertical adjustment with respect thereto, bearing hangers having a free pivotal connection with the frame and provided with slots extending longitudinally thereof, and a roller having a shaft journaled in the slots of the bearing hangers, the bearing hangers permitting the roller to remain in contact with the ground during and after the upward adjustment of the frame to raise the ground working implements out of contact with the ground.

In testimony whereof I affix my signature.

NEILL A. WATSON.